March 3, 1936.  C. W. VOGT  2,032,961
APPARATUS FOR INJECTING FRUIT AND NUTS INTO ICE CREAM
Filed Feb. 1, 1933  3 Sheets-Sheet 1
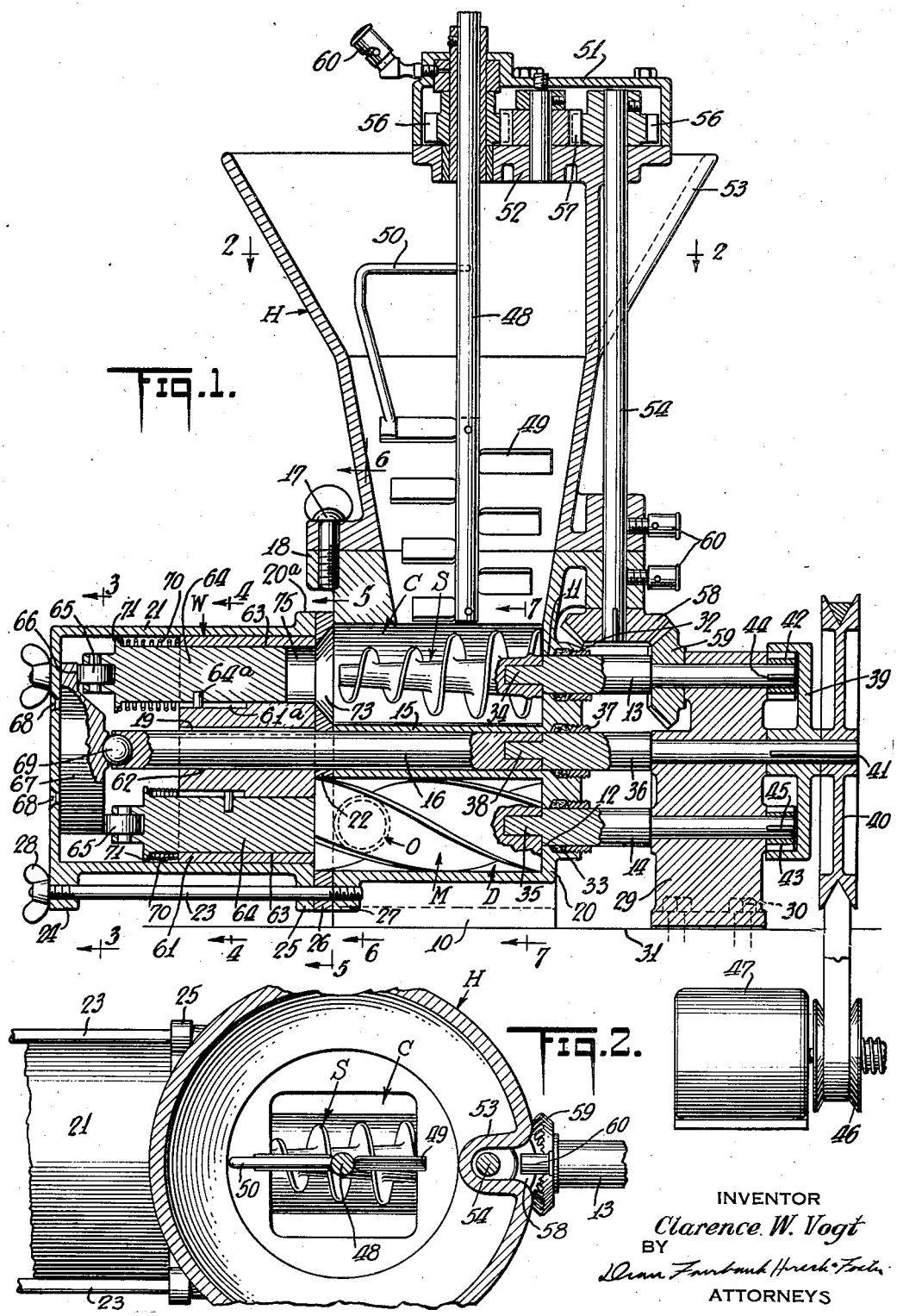
INVENTOR
Clarence W. Vogt
BY
ATTORNEYS

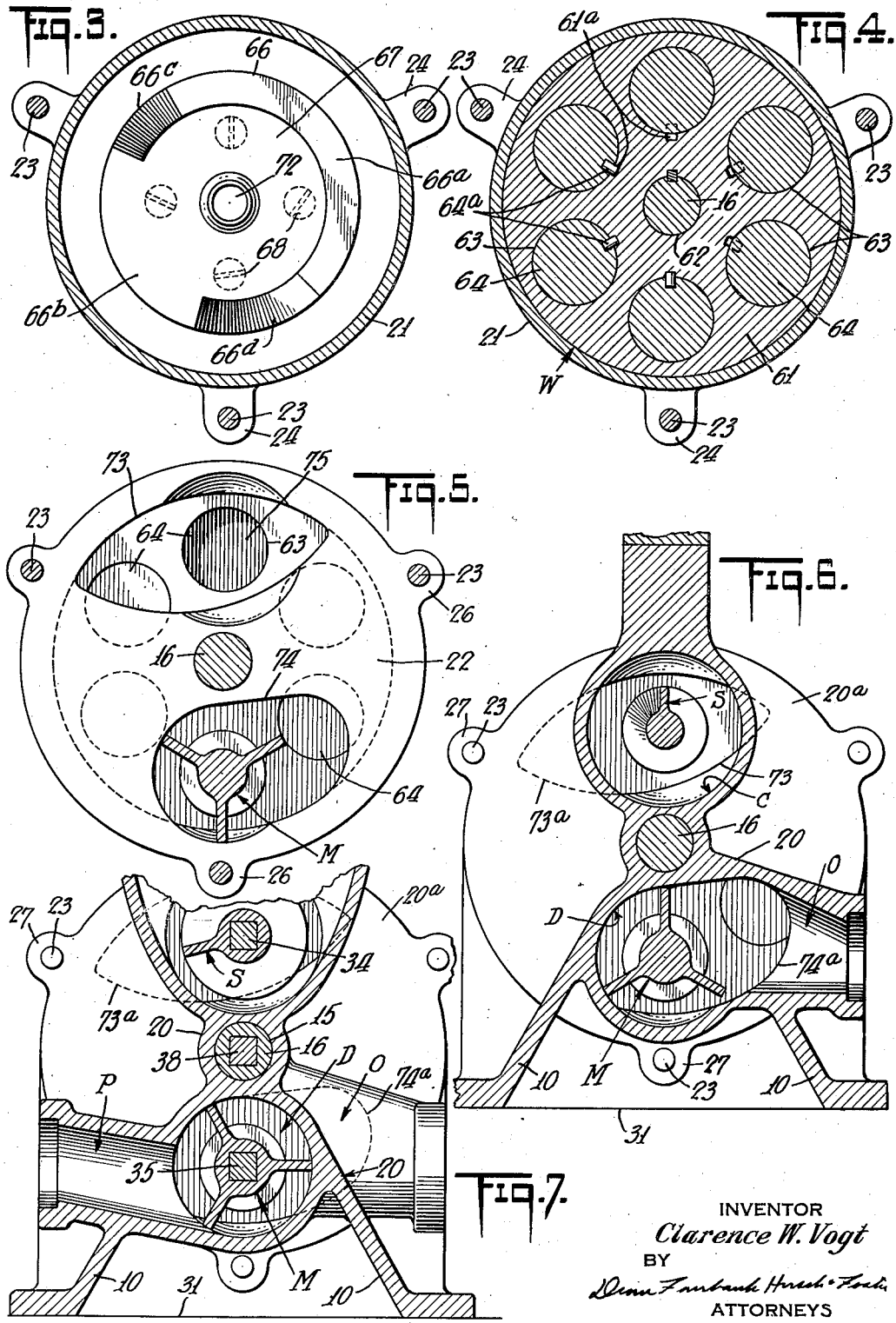

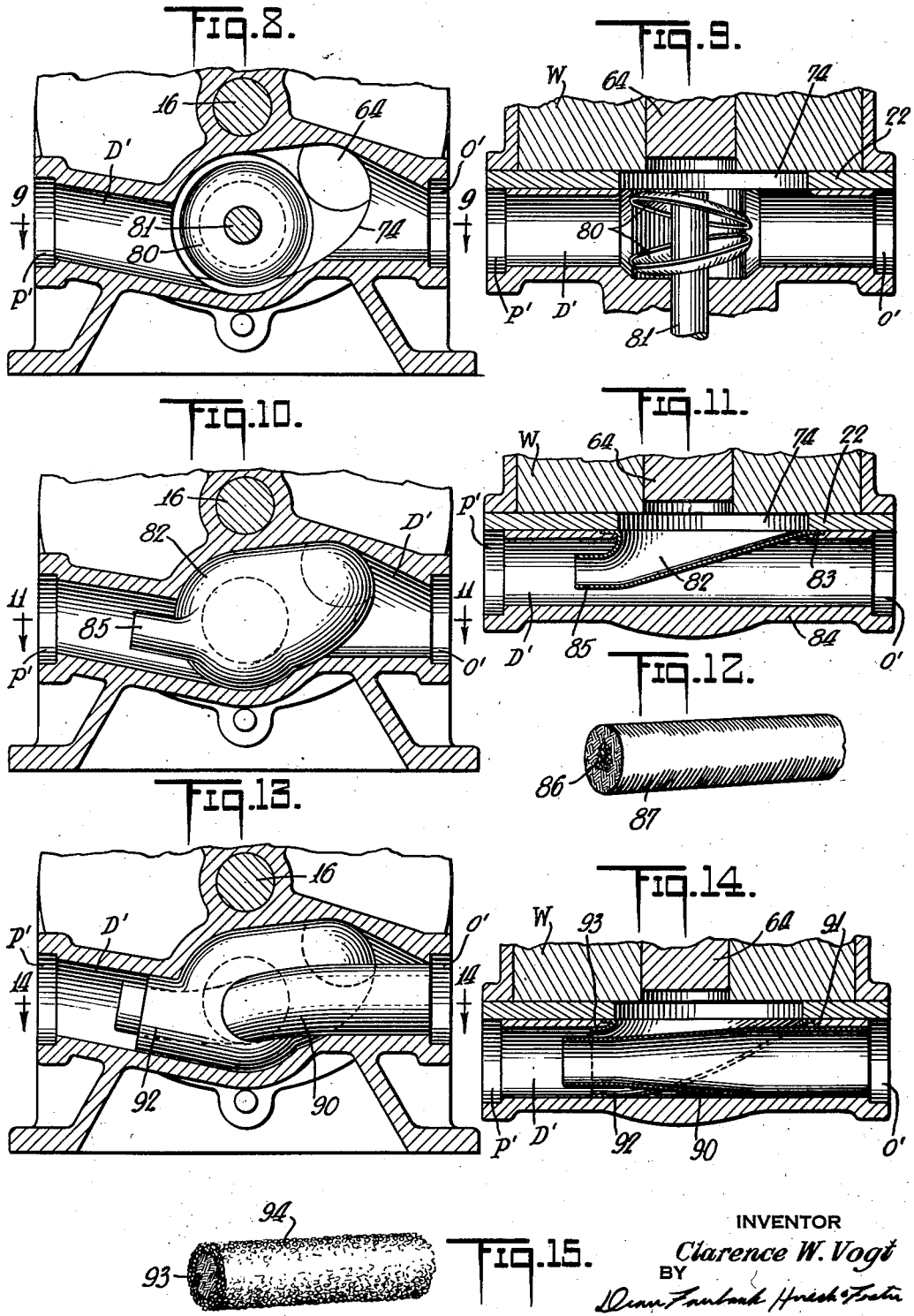

Patented Mar. 3, 1936

2,032,961

UNITED STATES PATENT OFFICE 2,032,961

APPARATUS FOR INJECTING FRUIT AND NUTS INTO ICE CREAM

Clarence W. Vogt, Louisville, Ky., assignor, by mesne assignments, to Vogt Processes, Incorporated, Louisville, Ky., a corporation of Delaware Application February 1, 1933, Serial No. 654,668

24 Claims. (Cl. 107—1)

This invention while capable of usefulness in allied arts, relates primarily to a method of and apparatus for performing certain steps in the preparation of frozen comestibles of the character which include pieces of normally solid edible material such as fruits or nuts.

More specifically the invention relates to the preparation of ice cream, water ice or sherbet containing nuts or fruits and to a means for and mode of introducing these solid edible ingredients into the mix while the latter is in a plastic partially frozen state.

The invention provides a method of and means for inroducing at any desired rate fruits and/or nuts into a continuously flowing stream of mix; typically a stream of plastic mix moving from a continuous freezer such as illustrated in my prior Patent Nos. 1,783,864, 1,783,865, 1,783,866 or 1,783,867 of December 2, 1930 into receiving cans, containers, wrappers or the like, through a filler or delivery mechanism which maintains the stream under pressure. A can filler which might be used is disclosed in Patent No. 1,881,106 issued to Gilbert O. Wymond and myself on October 4, 1932 and a continuous wrapping and freezing mechanism which might be used is illustrated in my copending application Serial No. 628,322, filed August 11, 1932.

An object of the invention is to effect positive and substantially continuous introduction of measured quantities of the solids into the moving stream of mix at a rate predeterminable independently of the rate of movement of the mix.

Another object is to effect a predetermined correlation of the solids with the mix at or near the point of introduction of the solids. This correlation may typically include uniform distribution of the solids through the mix, or the solids in the form of a core surrounded by the mix or distribution of the solids around the outer surface of a core of mix.

Another object is to provide a mix agitating or fruit or nut distributing mechanism which is synchronized with the means for feeding in the nuts or fruits, yet which when at rest will not block the continued flow of the mix from the freezer into the receiving cans.

Another object is to so design the feed mechanism for the nuts or fruits that regardless whether such mechanism is at rest or in motion it will not afford any crevice or opening which might relieve pressure on the flowing mix or let the mix force its way into and through the feeding mechanism.

Other objects are to provide a nut or fruit feeding arrangement which will not involve retardation of the speed of the continuous freezing process nor impede the free flow of such mix through capacious passageways, nor require synchronization of the nut or fruit feeder or mix agitator with the motivating mechanism for the freezer.

Another object is to provide a fruit and nut handling and feeding mechanism which though positive in action will not crush or excessively pulverize, shred or break the pieces of material supplied to it.

Other objects are to provide an apparatus which may be readily opened up for purposes of thorough cleansing and which is not subject to stalling either by the solids jamming the moving parts thereof or by becoming gummed with the mix, even though the nut and fruit feed is cut off during long periods of time while the stream of mix flows past and against it.

Other and more general objects are to provide a mechanism of the character described which is of simple, practical, rugged, durable, sanitary construction, substantially fully automatic in operation and with all parts coming in contact with the foodstuffs readily accessible for purposes of cleaning.

In a preferred embodiment of the invention the nuts or fruits are continuously but non-positively advanced from a hopper into measuring pockets in a continuously moving transfer mechanism and positively expelled from these pockets into a stream of mix under pressure which is flowing from freezer and which may be subjected to continuous stirring or agitation adjacent to the delivery point of the solids.

The invention may be more fully understood from the following description in connection with the accompanying drawings, wherein:

Fig. 1 is a vertical sectional view through my improved nut and fruit feeding and mixing machine illustrating diagrammatically the variable speed drive therefor, Fig. 2 is a sectional plan view on the line 2—2 of Fig. 1, Figs. 3, 4 and 5 are slightly enlarged transverse sectional views on the lines 3—3, 4—4 and 5—5 respectively of Fig. 1, Fig. 6 is a transverse sectional view on the line 6—6 of Fig. 1 showing the inlet end of the mixing chamber, Fig. 7 is a fragmentary transverse sectional view through the outlet end of the chamber and taken on the line 7—7 of Fig. 1, Fig. 8 is a fragmentary vertical sectional view through a modified type of mixing chamber and illustrating a modified form of agitating means, Fig. 9 is a fragmentary sectional plan on the line 9—9 of Fig. 8, Fig. 10 is a view similar to Fig. 8 but illustrating a further modification, Fig. 11 is a sectional plan detail on the line 11—11 of Fig. 10, Fig. 12 is a perspective view of the product produced by the apparatus of Figs. 10 and 11.

Fig. 13 is a view similar to Fig. 8 but illustrating a still further modification, Fig. 14 is a transverse sectional detail on the line 14—14 of Fig. 13, and Fig. 15 is a perspective view of the product produced by the apparatus of Figs. 13 and 14.

The machine illustrated in Figs. 1 to 7 includes a hopper H in which the nuts or fruits are deposited. Below and in free communication with the hopper is an elongated horizontal chamber C in which revolves a tapered conveyor screw S for non-positively advancing the solids against a rotary transfer member W in the form of a cylinder or turret and which for descriptive convenience will be referred to herein as a wheel. This wheel rotates on a horizontal axis and carries measured quantities of the fruits or nuts to a second horizontal cylindrical chamber D arranged below chamber C. The ice cream mix flowing from a continuous freezer (not shown) enters laterally through an entrance opening O (Fig. 6) at one end of chamber D and passes out of this chamber through a lateral outlet passageway P (Fig. 7) whence it flows to the cans or receptacle or wrapper, or any back pressure applying means through a conduit (not shown). An agitating or mixing screw M of sufficiently steep pitch so that it has no substantial conveyor function, rotates on a horizontal axis within chamber D, such screw having widely spaced spiral blades which clear the walls of the chamber throughout the length of the latter. When nuts or other solids are being fed into the chamber D, screw M effects thorough and even distribution thereof throughout the mix. With no nuts being fed and screw M stopped the plastic mix flows freely around and along the blades of the screw through chamber D and thence through outlet P.

As best seen in Figs. 1, 6 and 7, a unitary casting member 20 standing on integral diverging flanged legs 10 serves to define chambers C and D and the lower part of hopper H and also to provide bearings at 11 and 12 for the shafts 13 and 14 which drive the screws S and M. Likewise a hollow cylindrical bore 15 in the casting between the chambers C and D affords a bearing for the shaft 16 which drives the transfer wheel W. The hopper H proper is in the form of another casting member bolted at 17 upon the flanged upper end 18 of casting 20. The transfer wheel W is fixedly keyed at 19 upon the projecting end of shaft 16 and is concealed within a cylindrical shell or cast housing 21 the open end of which abuts a vertically disposed plate 22. This plate is clamped between the end of casting 20 and a circular end plate 20ª of casting 21 by tie bolts 23 passing through lugs 24, 25 at opposite ends of casting 21 through lugs 26 in plate 22 and lugs 27 on casting extension 20ª. Thumb nuts 28 on the outer ends of the tie bolts facilitate convenient bodily removal of casting 21 wheel W, plate 22 and shaft 16 as a unit as will be more particularly hereinafter described.

A block 29 bolted at 30 to the same table or bed 31 upon which casting 20 is mounted affords bearings for the reduced ends of shafts 13 and 14. The enlarged intermediate portions of these shafts work in stuffing boxes 32, 33 associated with bearings 11 and 12. Within the chambers C and D, these shafts terminate in reduced squared extensions 34, 35 fitting into correspondingly squared sockets in the ends of the shanks or stems of the screws S and M. Similarly a shaft 36 aligned with shaft 16 has a reduced end journaled in block 29, an intermediate portion journaled in a stuffing box 37 in casting 20 and a reduced squared extension 38 fitting a correspondingly shaped socket in the end of shaft 16.

By virtue of this arrangement when thumb nuts 28 are removed shell 21, wheel W, shaft 16 and plate 22 are removable as a unit from the machine. After their removal screws S and M may be pulled off their shafts 13 and 14 so that all parts subject to contact with the fruits or nuts or with the mix may readily be cleaned.

The shafts 13, 14 and 36 are restrained against endwise movement during this disassembly operation since they are each keyed to a gear disposed beyond the outer face of block 29. An internal gear 39 as well as a driving pulley 40 are keyed at 41 upon the projecting end of shaft 36. Gears 42, 43 keyed at 44, 45 on the projecting ends of shafts 13, 14 mesh with the internal gear 39 so that as the pulley is driven in a clockwise direction (looking at the outer side of the pulley), screws S and M and transfer wheel W will likewise turn in a clockwise direction. This direction of rotation of screw S causes it to advance the fruits or nuts toward the transfer wheel. It also causes the agitating screw M to rotate against the inflowing stream of plastic mix entering chamber D through inlet O.

The drive for the pulley 40 includes a conventional speed varying mechanism such for instance as the Reeves variable speed motor pulley 46 shown diagrammatically in Fig. 1 as interposed between speed reducer 47 and the pulley 40. The speed reducer 47 is driven by suitable power means (not shown).

Before describing the structural details of the transfer wheel it may be noted that any suitable agitating mechanism to prevent arching over or jamming of the nuts or fruits in the hopper and to gently press them against the conveyor screw S may also be driven directly or indirectly from the main drive shaft 36. Illustratively a vertical shaft 48 disposed in hopper H carries staggered sets of agitating blades 49 as well as a breaker arm 50 to prevent arching over of the solid material at the bottom of the flared hopper mouth. The blades exert a lifting pressure on the fruits or nuts to keep them agitated and prevent them from jamming. If desired the angle of the lowermost blade or blades might be reversed to force the nuts gently against the screw. Shaft 48 is suspended from a gear case 51 the bottom 52 of which may be an integral inwardly extending part of the hopper casting. This casting is likewise deeply laterally indented as at 53 to dispose a vertical driving shaft 54 outside of the hopper so that such shaft cannot contact with the comestibles. Shafts 54 and 48 are keyed respectively to gears 55 and 56 in the case 51 and gear 55 drives gear 56 through an idler 57. The lower end of shaft 54 carries a bevel gear 58 meshing with a similar gear 59 on the shaft 13.

Thus the nuts or fruits or other solid particles are all stirred and prevented from arching over in the hopper H and when they reach the lower part of the hopper they drop into the screw chamber C where they are moved toward the transfer wheel by the blades of the screw. Suitable grease cups 60 lubricate shaft 54 and gears within case 51.

The function of the transfer wheel is to pick up measured quantities of fruits or nuts from chamber C and positively inject them substantially continuously into the mix which is flowing under pressure through chamber D. While other means may be used to accomplish the desired result the particular mechanism herein illustrated is particularly effective.

The wheel (Figs. 2 to 5) comprises a cylindrical block 61 having a central longitudinal bore 62 in which shaft 16 is keyed and having a circularly arranged series of longitudinal bores 63 therein. Each bore 63 is spaced an equal distance from bore 62 and each bore 63 is spaced an equal distance from adjacent corresponding bores. Plungers 64 work in the bores 63. Each plunger is movable into an extreme position where one end thereof is flush with that end face of block 62 in contact with plate 22. The other ends of the plungers carry rollers 65 travelling on a circular cam track 66 forming part of a cam block 67 bolted at 68 to the inner face of the closed end of the wheel housing 21. The center of this block has a recess 72 therein receiving a ball thrust bearing 69 for the end of shaft 16. The rollers are urged into contact with the cam 66 by coiled expansion springs 70 encircling the ends of plungers 64, reacting against block 61 and engaging external flanges 71 on the plungers. Studs 64$^a$ on the plungers ride in trackways 61$^a$ in the block to prevent rotary motion of the plungers which might untrack or twist rollers 65.

Each plunger when retracted cooperates with its bore to define a measuring pocket 75 (Fig. 1) into which the fruits or nuts from the chamber C are pressed and from which the fruits or nuts are expelled by the action of the plunger itself into the chamber D.

The plate 24 has a lunar shaped opening 73 therein a portion of which registers with chamber C. It also has a generally oval irregularly shaped opening 74 registering with chamber D. Through these openings the nuts or fruits pass to the transfer wheel from chamber C and to the chamber D from the transfer wheel and the plate 22 holds the contents of the filled pockets 75 in place during movement of filled pockets from opening 73 to opening 74.

Circular cam 66 (Fig. 3) includes a flat low surface 66$^a$, a flat high surface 66$^b$ and a relatively short descending ramp 66$^c$ and a relatively long ascending ramp 66$^d$ connecting the flat surfaces. The relationship of these various elements of the cam to plate openings 73 and 74 may be readily observed by a comparison of Figs. 3 and 4. Bearing in mind that wheel W is rotating in a clockwise direction it will be clearly evident that as the center of each plunger 64 reaches the opening 73 its roller will start to descend ramp 66$^c$ and allow spring 70 to start retracting the plunger. As the plunger reaches a position wholly within the confines of opening 73 and tangential thereto the plunger will have been just fully retracted and the roller will be riding on the low side 66$^a$ of the cam. With the pocket 75 at its deepest, nuts and fruits will be pushed into it by the screw S and the filled pocket will pass out of registration with opening 73. At exactly the same time that this pocket starts to pass out of registration however another retracted plunger will move into full registration so that the feeding of material into the moving pockets is continuous.

The plungers are not projected until the pockets have moved into complete registration with lower opening 74 since otherwise the contents of the pockets would be crushed. The instant that a pocket moves into complete registration with opening 74 the roller for the plunger of that pocket starts to ride up on cam ramp 66$^d$. This ramp effects complete ejection of the material from the pockets into the moving plastic mass of ice cream just before the pockets start moving out of registration with opening 74 and just as a filled pocket reaches discharging position. Thus delivery of the contents of the various pockets of the measuring and transfer wheel is also continuous. With the plunger fully projected, its roller travels on the high side 66$^b$ of the cam until it again reaches ramp 66$^c$ and starts to retract.

Obviously if desired the plunger retracting springs might be replaced by a more positive mechanism, that is to say, the plungers might be positively interlocked with the cam track. The more important thing however is to insure very accurate projection of the plungers and to project them fully before they move out of registration with the opening 74 to the end that there can be no relief of pressure on the cream at this point and so that the portions of the transfer wheel which are moving out of registration with the opening 74 will afford no crevices or crannies which might either relieve pressure or which might carry part of the ice cream mix up into the chamber C. It is quite important that the transfer wheel fit against the face of the plate 22 with sufficient snugness so that there will be no outlet for the plastic mix between the plate and the transfer wheel or through the transfer wheel.

The walls of that part of opening 73 directly in line with the end of the feed screw S are bevelled to guide the nuts or fruits into the pockets at the region of maximum pressure on the material to be fed.

Those portions of plate openings 73 and 74 not in juxtaposition with chambers C and D define recesses 73$^a$, 74$^a$ (shown in dotted lines in Figs. 6 and 7) which communicate with the chambers C and D. The purpose of recess 73$^a$ is to give more time for a measuring pocket to become filled with solids than the time interval afforded by passage of such pocket across the end of chamber C. Similarly recess 74$^a$ permits the nuts to be discharged over a greater area of the plastic mass in chamber D, the tendency of wheel being always to frictionally urge the mass out of recess 74$^a$ and prevent a dead pocket at this point.

It will be obvious that within reasonable limits, the smaller the size of the pockets 75, the greater number of these pockets will have to be filled and emptied in order to effect the displacement of a given amount of solids from the hopper H into the chamber D. Obviously, there is a limit to the smallness of the pockets, provided the particles are not to be broken into excessively small bits. With my construction, it will be seen that the pocket size can be reduced simply by bushing the bores 63 and turning down the ends of the plungers 64 or provide smaller ones to fit the internal bore of the bushings. Provided this reduction in size of the pocket is not carried too far, it is not necessary to change the speed of screw S, but this, of course, can readily be taken care of by changing the gearing 43, 42 and 39, or by change in the diameter or pitch or length of the blade of screw S.

While the operation of the machine will be more or less self-evident from the foregoing description it may be briefly summarized as follows. The plastic mass to receive the subdivided solid material flows into chamber D through opening O. Typically this mass is a stream of partially frozen comestible such as ice cream passing from the discharge end of one of my continuous freezers of the types shown in my prior Patents Nos. 1,783,864, 1,783,865, 1,783,867 or 1,783,868.

The hopper H is filled with the nuts and fruits and as the ice cream starts to move into chamber D the motor is started and the speed at which it drives the pulley 40 is set by means 47 in accordance with the particular requirements of the mixture to be made and the rapidity of movement of the plastic mass. As the pulley 40 starts turning, agitators 49, 50, screw S, wheel W and screw M start to move. The nuts or fruits are delivered into the pockets of the measuring and transfer wheel and ejected therefrom into the plastic mass and are thoroughly mixed with the plastic material by the agitating and mixing screw M which is turning in a direction opposed to the direction in which the mass enters chamber D.

The partially congealed ice cream with its uniformly distributed content of solid edible pieces or particles moves through outlet P to the can filling mechanism such as that of Patent No. 1,881,106 or wrapping mechanism such as that shown in application Serial No. 628,322 or other suitable means which exerts a back pressure on the stream of partially frozen mix.

The rate of feed of the fruits and nuts can obviously be varied at will. When no solid material is to be fed the motor driving the speed reducer 47 is stopped and the path of flow of the mix through chamber D between inlet O and outlet P is substantially unimpeded, by reason of the fact that the blades of the screw M are so pitched as to form a helical passage between the inlet and outlet ports, which are located near opposite ends of the chamber D and at substantially diametrically opposite sides of same, as shown in Fig. 7.

Many factors contribute to the ease with which the apparatus may be cleaned. The entire transfer wheel unit and plate 22 may be bodily removed. When so removed plate 22 drops off by gravity. The block and plunger unit slide out of the shell 21 and the plungers may be pulled out of their bores. The screws S and M may be pulled out and cleaned and access afforded to all parts of the hopper and chambers subject to contact with the foodstuffs.

Without any danger of jamming the mechanism the readily crushable solid pieces are handled gently enough to prevent mashing thereof yet are very positively measured, transferred, forced into the mix and uniformly distributed through it.

Figs. 8 and 9 of the drawings illustrate a slightly modified arrangement in which the chamber D' through which the plastic mass passes is in the form of a relatively short passageway extending parallel to the face of the transfer wheel unit. The arrangement of the plate 22 and its recess 74ª remain the same but a different type of agitator or mixer is employed. This mixer includes a pair of concave disks or plows 80 inclined with respect to each other and fixed upon a shaft 81 disposed in the same position as the shaft of the screw M in Figs. 1 to 7. Shaft 81 is continuously rotated during the passage of the mix from the inlet opening O' to the outlet P' and as the nuts are continuously fed into the mix the plows which are preferably of concavo-convex formation, tend to thoroughly mull and plow in the solid particles and distribute them uniformly through the stream of mix. Obviously this plowing disk arrangement can be carried out in many ways and any desired number of disks or cooperating pairs of disks can be utilized.

Figs. 10 and 11 show a type of construction similar to that of Figs. 8 and 9 except for the fact that no agitating mechanism is utilized and the nuts or fruits are fed into the chamber D' through a generally funnel-shaped member 82. This member has its enlarged mouth portion flanged and clamped at 83 between the casting 84 which defines the chamber D' and the plate 22. The mouth of this funnel completely encircles the opening 74 to receive all fruits or nuts delivered from the transfer wheel and the reduced discharge end 85 of the funnel is disposed coaxially of the chamber D' near the outlet end thereof. The use of this construction of course results in continuously force-feeding the solids into the middle of the stream of plastic mix flowing under pressure and results in the production of an article illustrated in Fig. 12 having a core 86 composed essentially of fruits and/or nuts and completely enclosed in an annular body 87 of mix.

The form of the invention shown in Figs. 13 and 14 is essentially a reversal of the form shown in Figs. 10 and 11. Here the plastic mix is conducted through the tapering neck 90 of a hollow passage forming shell 91 fitted into the inlet end of the chamber D'. Tapering end of the shell 90 extends through a second shell 92 mounted to receive the nuts or fruits from the transfer wheel and having a discharge end which cooperates with the shell 91 to form an annular passageway 93 through which the nuts are forced into the mix. With this arrangement it will be apparent that the resulting article shown in Fig. 15 has a core 93 consisting of mix alone and surrounded by an annulus 94 which is thickly impregnated with the nuts or fruits. In Figs. 13 and 14 the funnel 93 corresponding to the funnel 85 has a restricted annular mouth through which a ring of solids are discharged around the flowing stream of mix.

It should be obvious that the mix and the solids may be correlated in various other arrangements such for instance as to provide layers of mix heavily impregnated with solids, if desired.

While the apparatus illustrated in Figs. 10, 11, 13 and 14 is primarily intended to facilitate the feeding of solid materials such as nuts or fruits either in the form of a core for the plastic mass or in the form of a shell for the plastic mass, it will be obvious that similar feeding arrangements may be utilized for introducing plastic materials under pressure into the flowing stream of mix and for providing the flowing stream of mix with a core or shell of differently flavored ice cream or other material. In the event that plastic material is forced through the funnels into the flowing stream of mix it may prove desirable to feed it in by a force pumping mechanism or some arrangement other than the transfer means here shown and which is primarily utilized for handling subdivided solids.

Having thus described my invention, what I claim as new and desire to secure by Letters Patent is:—

1. In a machine of the class described an elongated cylindrical chamber having a screw agitator mounted for rotation on an axis substantially coincident with the longitudinal axis of the chamber, said chamber being adapted to serve as part of a predetermined path of travel for a plastic edible mass flowing under pressure, means for positively introducing edible solids into the flowing mass, and means for rotating the agitator in a direction tending to retard the travel of the plastic mass in said chamber.

2. In a machine of the class described a hopper adapted to receive subdivided edible solids, a horizontally disposed chamber beneath the hopper into which the solids feed by gravity from the hopper, a second chamber below and paralleling the first chamber and adapted to define part of a predetermined flow path for a partially congealed plastic stream of edible material, and a transfer wheel travelling past one end of each of said chambers and defining pockets for transferring solids from the first chamber to the second chamber.

3. In a machine of the class described a hopper adapted to receive subdivided edible solids, a horizontally disposed chamber beneath the hopper into which the solids feed by gravity from the hopper, a second chamber below and paralleling the first chamber and adapted to define part of a predetermined flow path for a partially congealed plastic stream of edible material, and a transfer wheel movable across one end of each of said chambers and defining pockets for transferring solids from the first chamber to the second chamber, said wheel including means for forcibly ejecting the contents of the pockets into the plastic mass.

4. In a machine of the class described a hopper adapted to receive subdivided edible solids, a horizontally disposed chamber beneath the hopper into which the solids feed by gravity from the hopper, a second chamber below and paralleling the first chamber and adapted to define part of a predetermined flow path for a partially congealed plastic stream of edible material, a transfer wheel movable across one end of each of said chambers and defining pockets for transferring solids from the first chamber to the second chamber, said wheel including means for forcibly ejecting the contents of the pockets into the plastic mass, means for advancing the solids from the last mentioned chamber into the pockets of the wheel, and means in the other chamber for agitating the plastic mass adjacent the point of introduction of the solids.

5. In a machine of the class described a hopper adapted to receive subdivided edible solids, a horizontally disposed chamber beneath the hopper into which the solids feed by gravity from the hopper, a second chamber below and paralleling the first chamber and adapted to define part of a predetermined flow path for a partially congealed plastic stream of edible material, and a transfer wheel movable past one end of each of said chambers and defining pockets for transferring solids from the first chamber to the second chamber, said wheel including means for forcibly ejecting the contents of the pockets into the plastic mass, the pockets of the wheel being so arranged that while one pocket is filling with solids another pocket is discharging into the plastic mass.

6. In a machine of the class described a transfer mechanism including a rotatable block having a series of longitudinal cavities therein of uniform size spaced equidistantly from each other and spaced at equal distance from the axis of the block, unpacked plungers working in said cavities, springs tending to retract the plungers and define material receiving pockets, a stationary cam for periodically projecting the plungers to positively expel the contents of the pockets, a chamber into which said plungers deliver, and means for continuously forcing another material through said chamber.

7. A machine of the class described including a casting defining a pair of parallel elongated chambers, means for delivering subdivided solids into one chamber, the other chamber being adapted to define part of a predetermined flow path for a plastic mass, a plate extending across one end of each of the chambers and having openings therein registering with the chambers, and a transfer wheel arranged behind the plate and adapted to convey solid material from one chamber to the other.

8. A machine of the class described including a casting defining a pair of parallel elongated chambers, means for delivering subdivided solids into one chamber, the other chamber being adapted to define part of a predetermined flow path for a plastic mass, a transfer wheel adapted to convey solid material from one end of one chamber to the corresponding end of the other, shafts working through the other ends of the chambers, a screw conveyor in the solid-containing chamber for forcing the solids toward the transfer wheel, and an agitator in the other chamber, said conveyor and said agitator being attachable to and detachable from the ends of said shafts by an endwise sliding movement.

9. A machine of the class described including a casting defining a pair of parallel elongated chambers, means for delivering subdivided solids into one chamber, the other chamber being adapted to define part of a predetermined flow path for a plastic mass, a transfer wheel adapted to convey solid material from one chamber to the other, and a driving shaft mounted in the casting between the chambers keyed to the transfer wheel.

10. A machine of the class described including a casting defining a pair of chambers, means for delivering subdivided solids into one chamber, the other chamber being adapted to define part of a predetermined flow path for a plastic mass, a transfer wheel adapted to convey solid material from one chamber to the other, a driving shaft mounted in the casting between the chambers keyed to the transfer wheel, and a driving shaft for the transfer wheel shaft and from which the transfer wheel shaft is detachable by an endwise sliding movement.

11. A machine of the class described including a casting defining a pair of chambers, means for delivering subdivided edible solids into one chamber, the other chamber being adapted to define part of a predetermined flow path for a plastic edible mass, a transfer wheel adapted to convey solid material from one chamber to the other, and a circular shell enclosing the transfer wheel and securing said wheel to one end of said casting.

12. A machine of the class described including a casting defining a pair of chambers, means for delivering subdivided solids into one chamber, the other chamber being adapted to define part of a predetermined flow path for a plastic edible mass, a transfer wheel adapted to convey solid edible material from one chamber to the other, a circular shell enclosing the transfer wheel and securing said wheel to one end of said casting, and a cam mounted in said shell and controlling the reception and discharge of solids from the transfer wheel.

13. In combination a conduit for transporting a continuous stream of partially frozen ice cream under pressure, a chamber adapted to contain edible solids, a transfer mechanism having a pocket movable cyclically between filling position with respect to said chamber and discharging position with respect to said conduit, and means for varying the depth of said pocket during its movement between said filling position and said discharging position.

14. In combination a conduit for transporting a continuous stream of partially frozen ice cream under pressure, a chamber adapted to contain edible solids, means for transferring successive charges of solids from said chamber to discharging position with respect to said conduit, and means carried by said latter means for forcibly injecting the charges of solids into said conduit when they reach said discharging position.

15. In combination a conduit for transporting a continuous stream of partially frozen ice cream under pressure, a chamber adapted to contain edible solids, a rotor having a pocket movable between a filling position with respect to said chamber and discharging position with respect to said conduit, and a plunger carried in said pocket for forcing the solids from said pocket in discharging position into said conduit.

16. In combination a conduit for transporting a continuous stream of partially frozen ice cream under pressure, a chamber adapted to contain edible solids, a rotor defining a series of pockets annularly arranged around the axis of said rotor, said rotor being adapted to bring said pockets cyclically from filling position with respect to said chamber to discharging position with respect to said passage, and means carried by said rotor for forcibly ejecting the solids from said pockets into said conduit as said pockets reach said discharging position.

17. In combination a conduit for transporting a continuous stream of partially frozen ice cream under pressure, a chamber adapted to contain edible solids, and a mechanism for transferring successive charges of solids from said chamber to discharging position with respect to said conduit, said mechanism including a rotatable block having a series of longitudinal pockets therein of uniform size and spaced equal distances from the axis of the block, plungers working in said pockets, and carried by said block, and means for operating said plungers longitudinally in said pockets.

18. A machine of the class described including a pair of chambers one of which is adapted to contain subdivided edible solids and the other of which is adapted to serve as a passage for a continuously flowing stream of partially frozen ice cream under pressure, a transfer mechanism for transferring successive charges of solids from said first mentioned chamber to discharging position with respect to said second chamber, said mechanism having a circular series of bores therein for receiving said charges, plungers in said bores cooperating therewith to define movable bottomed pockets for receiving said charges, and a stationary cam cooperating with the ends of said plungers for periodically projecting said plungers to positively expel the contents of said pockets when in discharging position with respect to said second chamber.

19. In combination a conduit for transporting a continuous stream of partially frozen ice cream under pressure, a chamber adapted to contain edible solids, and a mechanism for transferring successive charges of solids from said chamber to discharging position with respect to said conduit and for injecting said charges into said conduit, said mechanism including a rotor having a pocket therein spaced from the axis of said rotor, a plunger working in said pocket and carried by said rotor, a cam for periodically projecting the plunger for positively expelling the contents of said pocket when in discharging position into said conduit, and means for retracting said plunger preparatory to the movement of said pocket in filling position with respect to said chamber.

20. In combination a pair of chambers, one of which is adapted to contain subdivided edible solids and the other of which is adapted to serve as a passageway for a continuously flowing stream of partially frozen ice cream under pressure, a pocket movable cyclically from filling position with respect to said first mentioned chamber into direct communication with said second chamber, and means for transferring said solids from said pocket in said latter position into said second chamber.

21. In combination a pair of chambers, one of which is adapted to contain subdivided edible solids and the other of which is adapted to serve as a passageway for a continuously flowing stream of partially frozen ice cream under pressure, a continuously rotating rotor having a pocket movable cyclically from filling position with respect to said first mentioned chamber into direct communication with said second chamber, and means for forcing said solids from said pocket in said latter position into said second chamber.

22. A machine of the class described including a pair of parallel elongated chambers, one of which is adapted to contain subdivided edible solids and the other of which is adapted to serve as a passageway for a continuously flowing stream of partially frozen ice cream under pressure, a transfer wheel movable past one end of each of said chambers and defining pockets for transferring solids from said first chamber to a discharging position with respect to said second chamber, and means for forcibly ejecting the solids from said latter position into said second chamber.

23. In combination a conduit for transporting a continuous stream of partially frozen ice cream under pressure, a chamber adapted to contain edible solids, a transfer mechanism having a pocket movable cyclically between filling position with respect to said chamber and discharging position with respect to said conduit, means for varying the depth of said pocket during its movement between said filling position and said discharging position, and a tubular member disposed within said conduit and having an inlet end registering with the discharging position of said transfer mechanism and its outlet end extending lengthwise of said conduit for introducing said edible solids as a core within said stream of ice cream.

24. In combination a conduit for transporting a continuous stream of partially frozen ice cream under pressure, a chamber adapted to contain edible solids, a transfer mechanism having a pocket movable cyclically between filling position with respect to said chamber and discharging position with respect to said conduit, means for varying the depth of said pocket during its movement between said filling position and said discharging position, and annular guide means adjacent to the discharging position of said transfer means for directing said edible solids lengthwise of said conduit and distributing them about a center core of the ice cream.

CLARENCE W. VOGT.